United States Patent
Van Ginkel et al.

(10) Patent No.: US 7,136,510 B2
(45) Date of Patent: Nov. 14, 2006

(54) BOREHOLE IMAGING

(75) Inventors: Michael Van Ginkel, Delft (NL);
Martin Alfred Kraaijveld, Rijswijk (NL); Etienne Reding, Rijswijk (NL); Pieter Wilhelmus Verbeek, Delft (NL); Lucas Jozef Van Vliet, Delft (NL)

(73) Assignee: Shell Oil Company, Houston, TX (US)

( * ) Notice: Subject to any disclaimer, the term of this patent is extended or adjusted under 35 U.S.C. 154(b) by 776 days.

(21) Appl. No.: 10/258,767

(22) PCT Filed: May 2, 2001

(86) PCT No.: PCT/EP01/04957

§ 371 (c)(1),
(2), (4) Date: Jan. 16, 2003

(87) PCT Pub. No.: WO01/84187

PCT Pub. Date: Nov. 8, 2001

(65) Prior Publication Data

US 2003/0165256 A1     Sep. 4, 2003

(30) Foreign Application Priority Data

May 2, 2000   (EP) ................................. 00303657

(51) Int. Cl.
*G06K 9/00* (2006.01)
*G06K 9/36* (2006.01)
*G01V 1/40* (2006.01)

(52) U.S. Cl. ............................ 382/109; 382/285; 702/6

(58) Field of Classification Search ................ 382/109, 382/154, 207, 260, 263, 266, 285, 254, 280, 382/286; 702/6, 10, 35, 9, 11; 73/152.01; 348/85

See application file for complete search history.

(56) References Cited

U.S. PATENT DOCUMENTS

| 5,162,994 | A | | 11/1992 | Torres |
| 5,299,128 | A | | 3/1994 | Antoine et al. |
| 5,737,277 | A | * | 4/1998 | Priest ........................... 367/27 |
| 5,960,371 | A | | 9/1999 | Saito et al. |
| 5,983,163 | A | | 11/1999 | Waid et al. |
| 6,226,595 | B1 | * | 5/2001 | Rossi et al. ................... 702/10 |

(Continued)

FOREIGN PATENT DOCUMENTS

FR     2772486     6/1999

(Continued)

OTHER PUBLICATIONS

"Generalizing the Hough Transform to Detect Arbitrary Shapes". D.H. Ballard. Pattern Recognition. vol. 13, No. 2. pp. 111-122, 1981.

(Continued)

*Primary Examiner*—Kanjibhai Patel

(57) ABSTRACT

A method of detecting significant events intersecting a borehole from an image of the borehole wall having: (a) converting the image into a three-dimensional orientation space; (b) selecting a parameter relation that represents the intersection of an event (3,5 and 6) with the borehole wall; (c) creating a parameter space consisting of numbers as a function of the parameters, wherein each number is a measure of the support in the orientation space for an event characterized by the parameters that pertain to that number; (d) selecting in the parameter space a set of the largest numbers, wherein the parameters that pertain to each of these largest numbers represent the intersections of the significant events with the borehole wall; and (e) presenting the intersections pertaining to the set of the largest numbers as a list of data representing significant events.

10 Claims, 2 Drawing Sheets

U.S. PATENT DOCUMENTS

2003/0165256 A1    9/2003   Ginkel et al. ............... 382/109

FOREIGN PATENT DOCUMENTS

WO          99 47947       9/1999

OTHER PUBLICATIONS

Stephane Mallat and Sifen Zhong, "Characterization of Signals from Multiscale Edges", IEEE TransactionS on Pattern Analysis and Machine Intelligence, vol. 14, No. 7, Jul. 1992, pp. 710-717.

* cited by examiner

BOREHOLE IMAGING

FIELD OF THE INVENTION

The present invention relates to detecting significant events intersecting a borehole from an image of the borehole wall. In the specification and in the claims, the word 'borehole' is used to refer to a borehole drilled in an underground formation, and examples of such events are fractures and bedding planes, which bedding planes are the interfaces between formation layers. In general these events will be planar on the scale of the borehole.

BACKGROUND OF THE INVENTION

The image of the wall of the borehole comprises a two-dimensional array of numbers, each number being the magnitude of a relevant borehole parameter at a point on the borehole wall. In the image, the co-ordinates of the point are given by the circumferential direction and the depth along the borehole. A tilted planar event intersecting a cylindrical borehole wall is shown on the image as a sinusoidal line.

The image is used for sedimentological and structural geological interpretation of the formation around the borehole. In this image relevant events have to be distinguished from the intersections shown in the image, this is normally done manually, however several automatic procedures have also been developed in the industry. These are generally based on variants of dip-meter algorithms, that determine cross-correlations of the button signals of the dip-meter in order to establish the orientation of formation layers intersecting the borehole wall. Dipmeter algorithms, however, are most suited to determine continuous or slowly varying bedding dips, but they are not capable of detecting intersecting planar events or single thin events that have an orientation that significantly deviates from the bedding orientation. For this reason, dipmeter algorithms are not useful to detect fractures in borehole images and the development of automatic procedures for fracture detection is an active area of research.

Such an image can be obtained by employing an acoustic tool, such as the Ultrasonic Borehole Imager (UBI) tool available from Schlumberger or the Circumferential Borehole imaging Logging (CBIL) tool available from Baker. These tools obtain an image from the borehole wall by emitting a focused beam of high-frequency acoustic energy towards the borehole wall, followed by a series of measurements on the signal that is reflected back from the borehole wall. Such an image can also be obtained by employing a microresistivity tool such as the Fullbore Micro Imager or the Formation Micro Scanner available from Schlumberger. The microresistivity tool comprises a number of pads with individual electrodes, which pads are during normal operation in contact with the borehole wall. The image can also be obtained by employing any other suitable tool.

U.S. Pat. No. 5,960,371 discloses a method of detecting significant planar events intersecting a borehole from an image of the borehole wall, which image comprises a two-dimensional array of numbers, each number being the magnitude of a relevant borehole parameter at a point defined by the circumferential direction $\phi$ and the depth z, which method comprises the steps of:

(a) determining for each point i of the image the slope $\eta_i$ of the sinusoids by computing the edge gradient direction;

(b) selecting a parameter relation ($z_i$=d−R tan $\Phi$ cos ($\phi_i$−α)) that represents the intersection of a planar event with the borehole wall, wherein the intersection is characterized by three parameters ($\Phi$, α, d);

(c) creating a discretized three-dimensional parameter space consisting of numbers as a function of the three parameters ($\Phi$, α, d), wherein each number is a measure of the support for a sinusoid passing through ($\phi_i$, $z_i$) with slope $\eta_i$ characterized by the parameters that pertain to that number;

(d) selecting in the parameter space a set of the largest numbers, wherein the parameters that pertain to each of these largest numbers represent the intersections of the significant planar events with the borehole wall; and (e) presenting the intersections pertaining to the set of the largest numbers as a list of data representing significant planar events.

The intersection that pertains to the values for each parameter that pertain to the significant planar events can be presented to obtain a treated image.

Steps (c) and (d) of the known method are implemented via a so-called Hough Transformation. Improving the Hough Transformation by using the edge gradient direction is known from the article 'Generalizing the Hough transform to detect arbitrary shapes', D. H. Ballard, Pattern Recognition, Vol. 13, No. 2, pages 111–122, 1981.

In the known method information obtained from the edge gradient direction is used to further constrain the number of sets of parameters for which the support has to be evaluated. A disadvantage of the known method is that the edge detector is only capable of detecting the most prominent local orientation, which is insufficient in case of combined fractures and bedding or in case of intersecting fractures.

SUMMARY OF THE INVENTION

It is an object of the present invention to provide an improved method that allows distinguishing fractures from bedding and that has an improved signal-to-noise ratio for the detection of fractures.

BRIEF DESCRIPTION OF THE DRAWINGS

The invention will now be described in more detail by way of example with reference to the accompanying drawings, wherein the examples should not be construed to limit the scope of the invention.

To this end the method of detecting significant events intersecting a borehole from an image of the borehole wall, which image comprises a two-dimensional array of numbers, each number being the magnitude of a relevant borehole parameter at a point defined by the circumferential direction and the depth, according to the present invention comprises the steps of:

(a) converting the image into a three-dimensional orientation space consisting of a stack of two-dimensional images, wherein each two-dimensional image is obtained by applying an edge-detecting or line-detecting filter to the borehole image with a particular orientation of the filter;

(b) selecting a parameter relation that represents the intersection of an event with the borehole wall, wherein the intersection is characterized by n parameters;

(c) creating an n-dimensional parameter space consisting of numbers as a function of the n parameters, wherein each number is a measure of the support in the orientation space for an intersection characterized by the parameters that pertain to that number;

(d) selecting in the parameter space a set of the largest numbers, wherein the parameters that pertain to each of these largest numbers represent well supported intersections with the borehole wall; and (e) presenting the intersections pertaining to the set of the largest numbers as a list of data representing significant events.

The intersection that pertains to the values for each parameter that pertain to the significant events can be presented to obtain a treated image.

Figure 1:
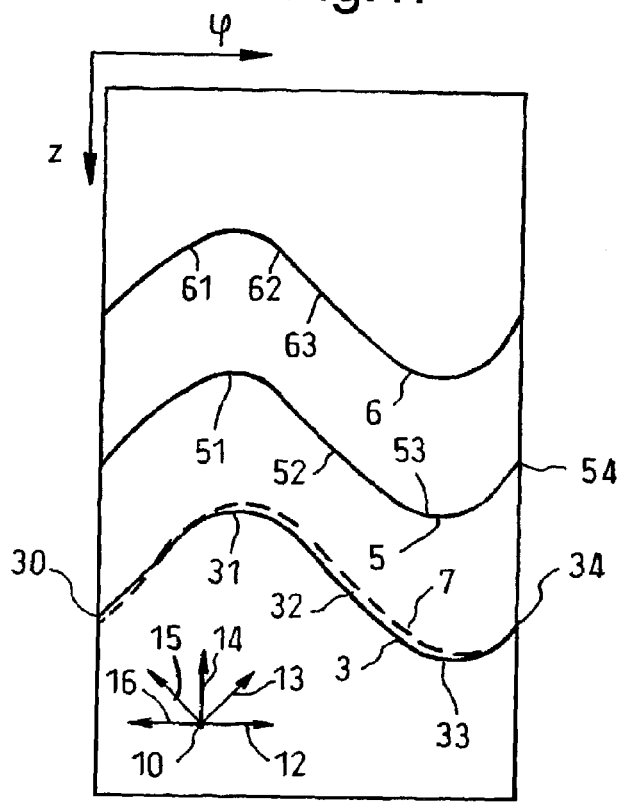
FIG. 1 shows schematically an original image obtained with an acoustic borehole imaging tool.

Reference is now made to FIG. 1. FIG. 1 shows schematically part of an original image of the borehole wall obtained with an acoustic tool. The horizontal co-ordinate is the circumferential direction $\phi$ and the vertical co-ordinate is the depth z along the borehole. In FIG. 1 three sinusoidal curves are shown, the curves are referred to with reference numerals 3, 5 and 6. The three sinusoidal curves 3, 5 and 6 represent intersections that show planar events intersecting the borehole wall. The dashed line 7 represents an artificial sinusoidal curve that was not present in the original image.

The graphical representation as shown in FIG. 1 is obtained from the two-dimensional array of numbers, each number being the magnitude of a relevant borehole parameter. In the case of an acoustic tool the relevant borehole parameter is the amplitude of the acoustic pulse that is reflected on the borehole wall, and in the case of a microresistivity tool the formation resistivity. In the specification and the claims the word 'image' is used to refer to an array of numbers and to the graphical representation of this array.

The first step of the method of treating this original image is converting the original image into a three-dimensional orientation space consisting of a stack of two-dimensional images, wherein each two-dimensional image is obtained by applying an edge-detecting or line-detecting filter to the image with a particular orientation of the filter.

One way to describe this step mathematically is by using the following equation: $I^{OS}(\phi, z, \psi) = I(\phi, z)*F(\phi, z, \psi)$, wherein $I(\phi, z)$ is the magnitude of the relevant borehole parameter in a point $(\phi, z)$ of the original image as shown in FIG. 1, $F(\phi, z, \psi)$ is the transfer function of the filter rotated over the filter orientation $\psi$, $I^{OS}(\phi, z, \psi)$ is the transformation of the original image in the three-dimensional orientation space, and $I(\phi, z)*F(\phi, z, \psi)$ denotes the convolution of the image and the filter, $$I(\varphi,z)*F(\varphi,z,\psi) = \int_{-\infty}^{\infty}\int_{-\infty}^{\infty} I(\varphi-\varphi', z-z')F(\varphi',z',\psi)\,d\varphi'\,dz'.$$

The transfer function $F(\phi, z, \psi)$ of the filter can be a complex function.

The filter $F(\phi, z, \psi)$ is applied to the original image $I(\phi, z)$ at each point $(\phi, z)$ of FIG. 1. For a single point 10 in FIG. 1 the filter orientations are shown by means of arrows 12, 13, 14, 15 and 16. The filter orientations $\psi$ are 0, $\pi/4$, $\pi/2$, $3\pi/4$, $\pi$, respectively. Here the number of filter orientations is five, however, in practice a large number of filter orientations is used, for example between 32 and 64.

The image of FIG. 1 is converted into a three-dimensional orientation space with co-ordinate axes $\phi$, z and $\psi$, in which each filter orientation is represented by a plane of constant $\psi$ in the orientation space.

Figure 2:
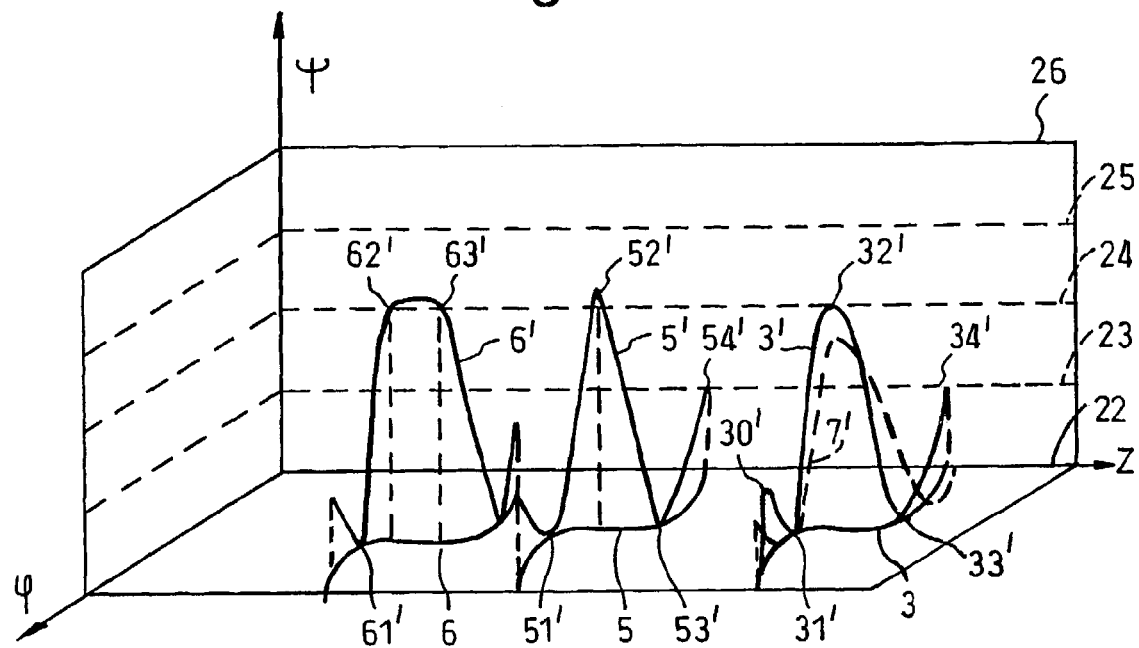
FIG. 2 shows schematically an orientation space, in which the trajectories of the support of the sinusoids in FIG. 1 are indicated by continuous lines.

An example of the orientation space is shown in FIG. 2. The intersections of the planes for the filter orientations 12, 13, 14, 15 and 16 in FIG. 1 and the z-$\psi$ plane, are referred to by 22, 23, 24, 25 and 26. After applying the filter to the sinusoidal curve 3 of FIG. 1, a curve 3' is obtained in FIG. 2, and the points 30, 31, 32, 33 and 34 on the curve 3 correspond to the points 30', 31', 32', 33' and 34' on the curve 3'. The curves in the orientation space that correspond to the sinusoidal curves 5 and 6 are curves 5' and 6'. The points 51, 52, 53 and 54 on sinusoidal curve 5 correspond to the points 51', 52', 53' and 54' in the orientation space, and the points 61, 62 and 63 on sinusoidal curve 6 correspond to the points 61', 62' and 63'. It will be understood that FIG. 2 is a graphical representation of a three-dimensional array of numbers, each number representing the output of the oriented filter.

Converting the image into a three-dimensional orientation space is the essential step of the method of the present invention, because now the support for the orientation along the sinusoidal line representing the intersection is taken into account in the subsequent selection of the sinusoids that have most support in the input image.

The next step of the method according to the present invention comprises selecting a parameter relation that represents the intersection of an event with the borehole wall, wherein the intersection is characterized by n parameters.

In case the event is a planar event, a suitable parameter relation, that can represent the intersection of the planar event with a cylindrical borehole wall is $z=d+A \sin(\phi-\alpha)$, wherein d, A and $\alpha$ are the three parameters that define a sinusoidal curve.

Figure 3:
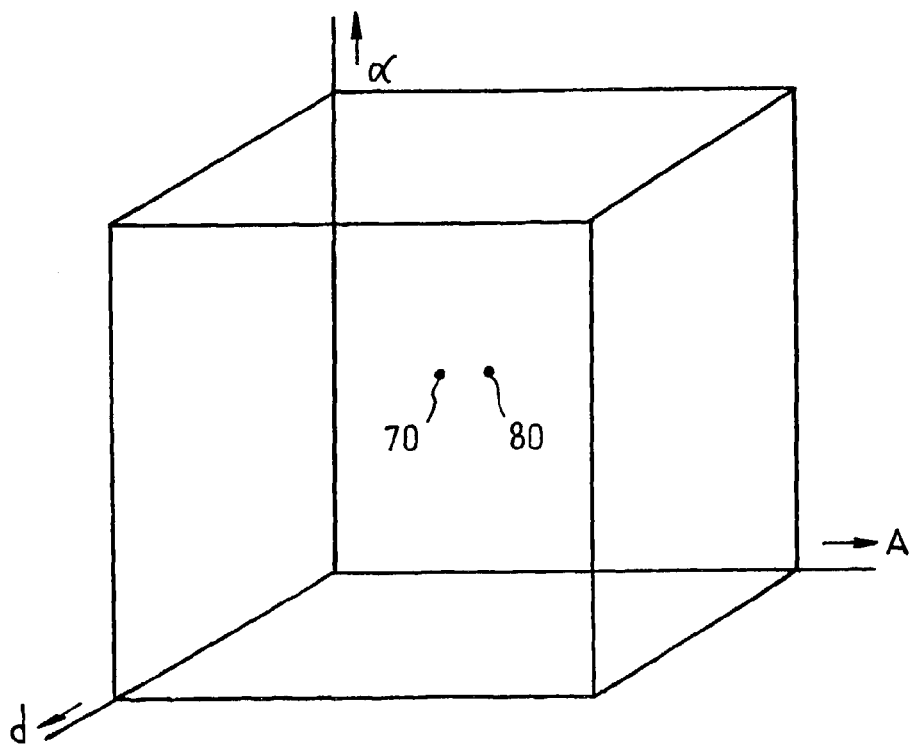
FIG. 3 shows schematically a parameter space.

The three parameters d, A and $\alpha$ are now used to define a parameter space, and this parameter space is shown in FIG. 3. A point in this parameter space corresponds to a particular sinusoidal curve.

Assume that the artificial sinusoidal curve represented by dashed line 7 in FIG. 1 is characterized by the parameters $d_0$, $A_0$ and $\alpha_0$ that are the co-ordinates of point 70 in the parameter space shown in FIG. 3. In an analogous way, the sinusoidal curve represented by line 3 in FIG. 1 is characterized by the parameters $d_1$, $A_1$ and $\alpha_1$ that are the coordinates of point 80 in the parameter space shown in FIG. 3. Then the dashed line 7' in the orientation space of FIG. 2 is the result of applying the oriented filter on the sinusoidal curve 7. Summing the numbers along the curve 7' in FIG. 2 gives a total number that is a measure of the support in the orientation space for an intersection characterized by the parameters or co-ordinates that pertain to that number. Thus the number attributed to the point 70 will be lower than the number attributed to a point 80 in FIG. 3, wherein the co-ordinates of point 80 are the parameters of a sinusoidal curve that coincides with curve 3 in the original image. In conclusion the curve 7 gets less support than the curve 3. In this way a clear distinction is made between an artificial curve and an intersection that was present in the original image.

The numbers can be attributed to the points in the parameter space in various ways. Summation along a line in orientation space is a generalized form of the Radon transformation. The generalized Hough transformation is another possibility.

The next step of the method according to the present invention is selecting in the parameter space a set of large numbers including the largest number, wherein the parameters that pertain to each of these largest numbers represent the significant intersections. This is done by sorting the numbers in descending order, and taking the first m numbers, for example 10 or 100, wherein m depends on a user-provided number.

The intersection that pertains to the values for each parameter that pertain to the significant events can be presented. This presentation is then a treated image.

In order to improve the method in dealing with discontinuous sinusoids in the input image, in which case partial sinusoidal events can give support to multiple sinusoids in the input image step (d) of the method of the present invention suitably further includes some more steps.

The first step is selecting k intersections having a high support to form a set of k candidate intersections and sorting the set by support. The parameters that represent the candidate intersection having the largest support are stored in an array of intersections.

Then the data pertaining to the candidate intersection having the largest support are removed from the orientation space. Having done that, the support in the orientation space for the remaining candidate intersections is recalculated to obtain a reduced set of candidate intersections, which are sorted by support. The parameters that represent the candidate intersection having the largest support are added to the array of intersections. It will be understood that if the support for an intersection decreases significantly after removing the support for a higher ranked candidate intersection, it can be concluded that the latter intersection shared support with the higher ranked candidate intersection. The removal and recalculation steps are repeated for all candidate intersections to obtain an ordered set of intersections.

The last step is selecting from the ordered set of intersections a subset of k−i intersections having the largest support, and presenting the k−i intersections as a list of data representing significant planar events, wherein i can be any number less than k.

The number k is suitably in the range of from about 10 to about 100.

Figure 4:
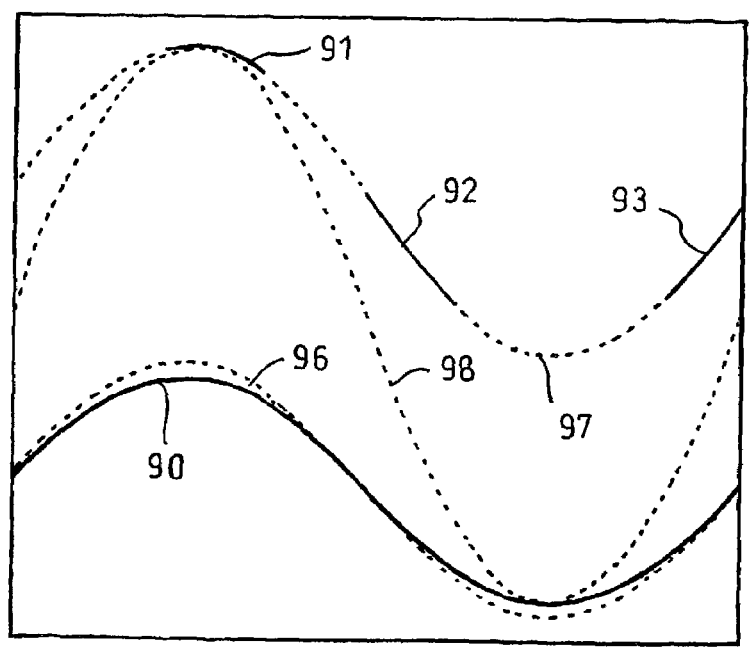
FIG. 4 shows schematically a synthetic image of a borehole wall.

An illustration of this method is discussed with reference to FIG. 4, which shows schematically a synthetic image of a borehole wall. The solid line 90 and the solid line segments 91, 92 and 93 show where there is support for intersections representing relevant planar events. The dotted lines 96, 97 and 98 represent candidate intersections having the largest support. The ordered set of intersections will have the sequence 96, 97 and 98. Selecting two (i=1) intersections out of the three (k=3), will allow discarding the intersection numbered 98.

When the image contains noise, there is support for a large number of curves representing intersections. In order to reduce the effect of noise, step (d) of the method of the present invention suitably further comprises a method to re-evaluate candidate events by determining whether they are supported by edges or lines in the original image that have a sufficiently narrow range of orientations. The expressions candidate events and candidate intersections are used synonymously in the specification and in the claims.

A suitable way of doing this comprises determining for every point in the orientation space that belongs to a well-supported candidate intersection a support set comprising those orientations for which the support is larger than a threshold value times the support of actual orientation of the well-supported candidate intersection; and removing the candidate intersection from the list of candidate intersections if the number of elements in the support set is relatively large compared to the number of filter orientations. The threshold value T is less than 1, for example 0.8. Thus, only those points on the trajectory are taken into account for which the support set is a sufficiently small fraction of the number of filter orientations.

The filter $F(\phi, z, \psi)$ is suitably a filter, of which the Fourier Transform is the product of three factors: $F_T(\omega, \theta, \psi)=G_r(\omega, \omega_c, \sigma_r)G_a(\theta-\psi, N)Q(\theta-\psi)$, wherein $G_r$ is the radial part of the filter, $G_a$ is the angular part of the filter and Q is the quadrature factor. The factor Q ensures that the filter is a quadrature filter, which is a filter wherein the phase difference between two responses is $\pi/2$.

The radial part of the filter is given by the following equation:

$$G_r(\omega, \omega_c, \sigma_r) = \left(\frac{\omega}{\omega_c}\right)^{(\omega_c^2/\sigma_r^2)} \exp\left(-\frac{\omega^2 - \omega_c^2}{2\sigma_r^2}\right).$$

The radial part of the filter selects a non-symmetric frequency band around $\omega_c$ having a width of $\sigma_r$.

The angular part of the filter is given by the following equation:

$$G_a(\theta - \psi, N) = \exp\left(-\frac{N^2(\theta - \psi)^2}{2\pi^2}\right),$$

wherein N is the number of filter orientations.

The factor Q ensures that the filter is a quadrature filter and is given by the following equation: $Q(\theta-\psi)=1$ for $-(\pi/2)<(\theta-\psi)<(\pi/2)$, $Q(\theta-\psi)=0$ for $-\pi<(\theta-\psi)<-(\pi/2)$ and $Q(\theta-\psi)=0$ for $(\pi/2)<(\theta-\psi)<\pi$.

In the spatial domain, the real part of the filter $F(\phi, z, \psi)$ is sensitive to even signals (lines) and the imaginary part is sensitive to odd signals (edges). If so required, the user can select to make the fracture detection sensitive to line or step edges only by selecting the real or imaginary part of the filter output, rather than the absolute value.

When the output of the oriented filter is a complex number, the numbers in the orientation space are the absolute value of the complex number, $|I^{OS}(\phi, z, \psi)|$.

It will be understood that other edge or line detecting filters can also be used.

An advantage of the method of the present invention is that multiple oriented structures can be detected. Furthermore, the method of the present invention is less sensitive to noise than the known methods.

We claim:

1. A method of detecting significant events intersecting a borehole from an image of the borehole wall, which image comprises a two-dimensional array of numbers, each number being the magnitude of a relevant borehole parameter at a point defined by the circumferential direction and the depth, which method comprises the steps of:
   (a) converting the image into a three-dimensional orientation space consisting of a stack of two-dimensional images, wherein each two-dimensional image is obtained by applying an edge-detecting or line-detecting filter to the image with a particular orientation of the filter;
   (b) selecting a parameter relation that represents the intersection of an event with the borehole wall, wherein the intersection is characterized by n parameters;

(c) creating an n-dimensional parameter space consisting of numbers as a function of the n parameters, wherein each number is a measure of the support in the orientation space for an intersection characterized by the parameters that pertain to that number;

(d) selecting in the parameter space a set of the largest numbers, wherein the parameters that pertain to each of these largest numbers represent well supported intersections with the borehole wall; and (e) presenting the intersections pertaining to the set of the largest numbers as a list of data representing significant events.

2. The method according to claim 1, wherein step (d) further includes the steps of:
- d1) selecting k intersections having a high support to form a set of k candidate intersections and sorting the set by support;
- d2) storing the parameters that represent the candidate intersection having the largest support in an array of intersections;
- d3) removing the data pertaining to the candidate intersection having the largest support from the orientation space;
- d4) recalculating the support in the orientation space for the remaining candidate intersections to obtain a reduced set of candidate intersections, sorting the reduced set by support, and adding the parameters that represent the candidate intersection having the largest support to the array of intersections;
- d5) repeating steps d3) and d4) for all candidate intersections to obtain an ordered set of intersections; and
- d6) selecting from the ordered set of intersections the k−i intersections having the largest support, and presenting the k−i intersections as a list of data representing significant events, wherein i can be any number less than k.

3. The method according to claim 1, wherein step (d) further comprises determining for every point in the orientation space that belongs to a well-supported candidate intersection a support set comprising those orientations for which the support is larger than a threshold value times the support of actual orientation of the well-supported candidate intersection; and removing the candidate intersection from the list of candidate intersections if the number of elements in the support set is relatively large compared to the number of filter orientations.

4. The method according to claim 2, wherein step (d) further comprises determining for every point in the orientation space that belongs to a well-supported candidate intersection a support set comprising those orientations for which the support is larger than a threshold value times the support of actual orientation of the well-supported candidate intersection; and removing the candidate intersection from the list of candidate intersections if the number of elements in the support set is relatively large compared to the number of filter orientations.

5. The method according to claim 1, wherein, in step (a), the stack of two-dimensional images comprises images obtained by applying the edge-detecting or line-detecting filter to the image at different orientations of the filter.

6. The method according to claim 1, wherein in step (a) the filter is applied at each point of the image with the particular orientation of the filter.

7. The method according to claim 1, wherein one dimension in the three dimensional orientation space in step (a) is formed by the filter orientation.

8. The method according to claim 1, wherein a Fourier transform of the filter is a product of a radial part of the filter, an angular part of the filter, and a quadrature factor.

9. The method according to claim 1, wherein the filter is a quadrature filter.

10. The method according to claim 1, wherein the transfer function of the filter is a complex function.

* * * * *